United States Patent
Yu et al.

(10) Patent No.: US 6,752,933 B2
(45) Date of Patent: Jun. 22, 2004

(54) PHOSPHORS HAVING LONGER LIFESPAN

(75) Inventors: Il Yu, Suwon (KR); Sang-hyuk Lee, Anyang (KR); Young-chul You, Suwon (KR); Kyu-chan Park, Suwon (KR)

(73) Assignee: Samsung SDI Co., Ltd., Suwon-Si (KR)

( * ) Notice: Subject to any disclaimer, the term of this patent is extended or adjusted under 35 U.S.C. 154(b) by 207 days.

(21) Appl. No.: 10/026,460

(22) Filed: Dec. 27, 2001

(65) Prior Publication Data

US 2002/0145379 A1 Oct. 10, 2002

(30) Foreign Application Priority Data

Jan. 27, 2001 (KR) .......................................... 2001-3887

(51) Int. Cl.⁷ ............................................. C09K 11/67
(52) U.S. Cl. ........................ 252/301.4 F; 252/301.4 S; 313/486
(58) Field of Search .................... 252/301.4 F, 301.4 S; 313/486

(56) References Cited

U.S. PATENT DOCUMENTS 5,619,098 A  4/1997 Toki et al.

OTHER PUBLICATIONS

Patent Abstracts of Japan, Publication No.: 08–0855788, dated Feb. 4, 1996.

*Primary Examiner*—C. Melissa Koslow
(74) *Attorney, Agent, or Firm*—Staas & Halsey LLP

(57) ABSTRACT

A phosphor having longer lifespan which includes sulfur and has a perovskite structure. The phosphor further satisfies the following formula:

$$MTiO_3:A$$

where M is an alkaline earth metal and A is a rare earth element. The sulfur-containing phosphor shows good luminance and lifespan characteristics compared to existing $SrTiO_3$ based phosphors, without containing cadmium that is harmful to the environment. Therefore, the phosphor is advantageously utilized for various display applications including vacuum fluorescent displays (VFDs) and field emission displays (FEDs).

23 Claims, 1 Drawing Sheet

• Ti
⬢ O
● Alkaline earth metal

PHOSPHORS HAVING LONGER LIFESPAN

CROSS-REFERENCE TO RELATED APPLICATIONS

This application claims the benefit of Korean Patent Application No. 01-3887, filed Jan. 27, 2001, in the Korean Patent Office, the disclosure of which is incorporated herein by reference.

BACKGROUND OF THE INVENTION

1. Field of the Invention

The present invention relates to phosphors for use in display devices such as vacuum fluorescent displays (VFDs) or field emission displays (FEDs).

2. Description of the Related Art

Like cathode ray tubes (CRTs), VFDs are self-radiating displays using phosphors, and are widely used in applications such as digital displays of household electric appliances and gauge panels of automobiles. While VFDs have mainly been used for low-capacity, small-sized products that simply display numbers, characters, and signs, they are currently in use for high-density graphic image displays. In the near future, a full color VFD having a large display capacity will be commercially viable.

FEDs have received considerable attention as a next generation display device having advantages of flat panel displays, such as liquid crystal displays (LCDs) and CRTs. Thus, research on FEDs continues to be actively conducted. FEDs, which operate on the principle of field emission of electrons from microscopic tips, are known to be capable of overcoming the drawbacks of CRTs, such as excessive bulk and weight, and the drawbacks of LCDs, such as high manufacturing cost and limited size and viewing angle.

Furthermore, since FEDs have various advantages, such as a thin film form, low power consumption, low manufacturing cost, excellent temperature characteristics, and high-speed operation, they can be used in a wide variety of applications ranging from home televisions to industrial equipment and computers. In particular, FEDs are likely to be widely used in commercial applications such as notebook PCs, monitors, and televisions, like thin film transistor (TFT) LCDs.

A phosphor able to be excited by a low-velocity electron beam is required for use in VFDs or FEDs in order to emit light at an anode voltage of no greater than 1 kV. Conventional phosphors able to be excited by low-velocity electron beams are divided into two types. The first type is a phosphor based on a low-resistance host matrix, and the second type is a phosphor based on a high-resistance host matrix and having a phosphor layer formed by adding a conductive material to reduce the resistance of the host matrix.

Japanese Patent Publication Gazette No. Heisei 8-85788 and U.S. Pat. No. 5,619,098 disclose an $SrTiO_2$ based phosphor prepared by adding a rare earth element and a Group 13 element to a host matrix composed of alkaline earth metal oxide and titanium oxide, the disclosures of which are incorporated by reference. The disclosed phosphor does not contain cadmium (Cd), which is known to be environmentally toxic and can be excited by low-velocity electron beams to emit light. However, this phosphor has not yet been put into practice due to its short lifespan.

SUMMARY OF THE INVENTION

To solve the above and other problems, it is an object of the present invention to provide a phosphor having a host matrix that does not contain cadmium (Cd) which is harmful to the environment, and which has good luminance and lifespan characteristics as compared to a conventional $SrTiO_3$ based phosphor.

Additional objects and advantages of the invention will be set forth in part in the description which follows and, in part, will be obvious from the description, or may be learned by practice of the invention.

Accordingly, to achieve the above and other objects of the present invention, there is provided a phosphor according to an embodiment of the invention comprising a perovskite structure which includes sulfur (S) and satisfies the following formula:

$$MTiO_3:A$$

where M is an alkaline earth metal and A is a rare earth element.

According to an aspect of the invention, the alkaline earth metal is Mg, Sr, Ca, or Ba, and the rare earth element is Ce, Pr, Eu, Tb, or Tm.

According to another aspect of the invention, an amount of the rare earth element added is in the range of 0.05–5 mol % based on 1 mol of Ti.

According to a further aspect of the invention, the phosphor having the formula $MTiO_3:A$ further comprises a Group 13 element of the periodic table.

According to a still further aspect of the invention, the Group 13 element is Al, Ga, In, or Tl.

According to yet another aspect of the invention, an amount of the group 13 element added is in the range of 0.05–80 mol % based on 1 mol of Ti.

According to an additional aspect of the invention, the sulfur contained in the phosphor is added in a form of a sulfur element or an alkaline metal sulfur-containing compound, and the alkaline metal sulfur-containing compound is one of $Na_2S_2O_3 \cdot 5H_2O$ and $Na_2SO_4$.

According to a yet additional aspect of the invention, the phosphor having the formula $MTiO_3:A$ above contains 0.1–10 wt % sulfur based on a total weight of the phosphor.

According to a still additional aspect of the invention, the phosphor having the formula $MTiO_3:A$ above further comprising the Group 13 element of the periodic table is $SrTiO_3:Pr,Al$ which includes S or $SrTiO_3:Pr,Ga$ which includes S.

According to another embodiment of the present invention, there is provided a fluorescent display device such as one of a field emission display and a vacuum fluorescent display comprising a phosphor of the present invention.

BRIEF DESCRIPTION OF THE DRAWINGS

The above objects and advantages of the present invention will become more apparent and more readily appreciated by describing in detail preferred embodiments thereof with reference to the accompanying drawing in which.

DETAILED DESCRIPTION OF THE PREFERRED EMBODIMENTS

Figure 1:
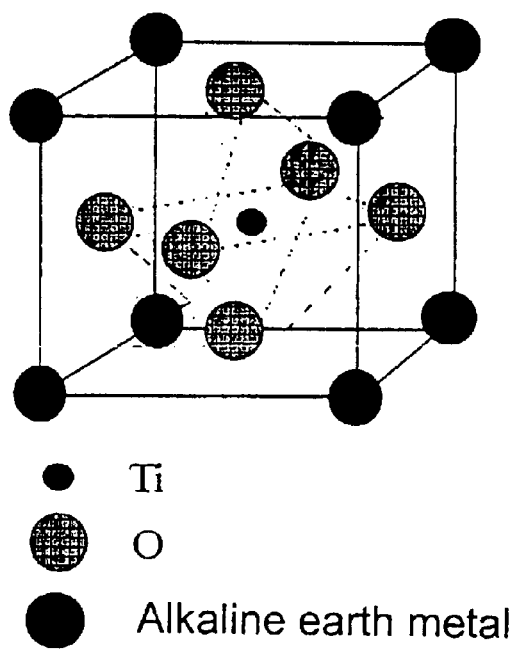
FIG. 1 is a diagram of a cubic perovskite structure of a phosphor according to the present invention.

Reference will now be made in detail to the present preferred embodiments of the present invention, examples of which are illustrated in the accompanying drawing, wherein like reference numerals refer to like elements throughout.

A phosphor according to an embodiment of the present invention has a longer lifespan and is prepared by changing the crystal lattice of a phosphor that contains a rare earth element and a Group 13 element based on a host matrix of an alkaline earth oxide and titanium (Ti) oxide, by the addition of sulfur or an alkaline metal sulfur-containing compound.

FIG. 1 shows a cubic perovskite structure of a phosphor according to the present invention. In particular, Ti is located at the center of the cubic perovskite structure, an alkaline earth metal is located on the vertices, and oxygen is located at the center of each face of the structure. Although not shown in FIG. 1, a rare earth element serving as an activator is located at the vertices by partially replacing an alkaline earth metal.

When the phosphor having the structure described above is excited by an external light, the light energy is absorbed by Ti and in turn transferred to the alkaline earth metal located at the vertices of the cubic perovskite structure to emit light. The activator substitute at the vertices considerably affects the light emission.

In consideration of the effect of energy transferred from the metal located at the center of the lattice structure to other neighboring constituents on a light emission, phosphor's characteristics can be improved by changing lattice parameters between constituents of the crystalline structure.

The phosphor according to the present invention has lattice parameters in a crystalline structure that are varied by partially substituting oxygen atoms in the structure with sulfur atoms by adding sulfur or alkaline metal sulfate to a phosphor host matrix having a perovskite structure. Bond distances between the center metal and the oxygen atoms (Ti—O) and between the alkaline earth metal and the oxygen atoms (e.g., Si—O) are changed by substituting the oxygen atoms with the sulfur atoms. The change in the lattice parameter affects a light emission from the phosphor, thereby improving a luminance and lifespan of the phosphor.

In the present invention, the sulfur or alkaline metal sulfur-containing compound is added to substitute the oxygen atoms present in the crystalline structure with the sulfur atoms. Preferably, the sulfur or an alkaline metal sulfur-containing compound is added in an amount of 0.1–300 mol % based on 1 mol of Ti. If the amount of the sulfur or the alkaline metal sulfur-containing compound is less than 0.1 mol % based on 1 mol of Ti, improvements in the luminance and lifespan are not significant. If the amount of the sulfur or the alkaline metal sulfur-containina compound added exceeds 300 mol % based on 1 mol of Ti, it is uneconomical in industrial terms. When the sulfur or the alkaline metal sulfur-containing compound is added in an amount of the above rate, the resultant phosphor contains about 0.1–10% by weight sulfur atoms based on the total weight.

The alkaline metal sulfur-containing compound added in the preparation of the phosphor according to the present invention is preferably sodium sulfate, more preferably $Na_2S_2O_3 \cdot 5H_2O$ (sodium thiosulfate pentahydrate) or $Na_2SO_4$.

The phosphor according to the present invention is prepared by a typical phosphor preparation method. For example, sulfur (S), an additive used in the present invention, is mixed with $SrCO_3$, $TiO_2$, $Al(OH)_3$, and $PrCl_3$ and ground in an alumina mortar. The resultant mixture is sintered at a temperature of about 1,000–1,500° C. for about 1–12 hours to obtain a phosphor according to the present invention.

While a conventional ZnCdS-based sulfide phosphor or $SrTiO_3$-based phosphor has poor lifespan characteristics, the phosphor containing S obtained according to the present invention has good luminance and lifespan characteristics. Additionally, the phosphor according to the present invention is environmentally friendly since it does not contain cadmium that is harmful to the environment. Therefore, a fluorescent display device according to another embodiment of the present invention comprising the phosphor of the present invention has good luminance and lifespan characteristics as compared to a conventional fluorescent display device.

Hereinafter, embodiments of the present invention will be presented in more detail.

EXAMPLE 1

1 mol of $SrCO_3$, 1 mol of $TiO_2$, 23 mol % $Al(OH)_3$, 0.5 mol % $PrCl_3$, and 6.2 mol % S were mixed and ground in an alumina mortar and sintered at a temperature of 1,200° C. for 3 hours to obtain a phosphor. An experiment was done to obtain a remaining luminance ratio after 1000 hours of operation, which is shown in Table 2, to determine the lifespan of the obtained phosphor.

EXAMPLES 2–8

Phosphors were prepared in the same manner as in Example 1 according to the compositions shown in Table 1. An experiment was done to obtain a remaining luminance ratio after 1000 hours of operation, which is shown in Table 2, to determine the lifespan of the obtained phosphor.

TABLE 1

| | | Composition for Examples 2–8 | | | | | | |
|---|---|---|---|---|---|---|---|---|
| Example | | Ex. 2 | Ex. 3 | Ex. 4 | Ex. 5 | Ex. 6 | EX. 7 | Ex. 8 |
| Alkaline earth metal | Compound | $SrCO_3$ | $SrCO_3$ | $SrCO_3$ | $SrCO_3$ | $SrCO_3$ | $SrCO_3$ | $SrCO_3$ |
| | Content (mol) | 1 | 1 | 1 | 1 | 1 | 1 | 1 |
| Ti oxide | Compound | $TiO_2$ | $TiO_2$ | $TiO_2$ | $TiO_2$ | $TiO_2$ | $TiO_2$ | $TiO_2$ |
| | Content (mol) | 1 | 1 | 1 | 1 | 1 | 1 | 1 |
| Group 13 | Compound | $Al(OH)_3$ | $Al(OH)_3$ | $Al(OH)_3$ | $Al(OH)_3$ | $Al(OH)_3$ | $Al(OH)_3$ | $Al(OH)_3$ |
| | Content (mol %) | 23 | 23 | 23 | — | — | 23 | 23 |
| Rare earth element | Compound | $PrCl_3$ | $PrCl_3$ | $PrCl_3$ | $PrCl_3$ | $PrCl_3$ | $PrCl_3$ | $PrCl_3$ |
| | Content (mol %) | 0.5 | 0.5 | 0.5 | 0.5 | 0.5 | 0.5 | 0.5 |

TABLE 1-continued

Composition for Examples 2–8

| Example | | Ex. 2 | Ex. 3 | Ex. 4 | Ex. 5 | Ex. 6 | EX. 7 | Ex. 8 |
|---|---|---|---|---|---|---|---|---|
| Additive | Compound | S | S | S | $NaS_2O_2 \cdot 5H_2O$ | $NA_2SO_3$ | $NaS_2O_2 \cdot 5H_2O$ | $Na_2SO_3$ |
| | Content (mol %) | 32 | 62 | 125 | 8 | 14 | 8 | 14 |
| Sintering temperature (° C.) | | 1,250 | 1,250 | 1,250 | 1,250 | 1,250 | 1,250 | 1,250 |
| Sintering time (hour) | | 3 | 3 | 3 | 3 | 3 | 3 | 3 |

COMPARATIVE EXAMPLE 1 mol of $SrCO_3$, 1 mol of $TiO_2$, 23 mol % $Al(OH)_3$, and 0.5 mol % $PrCl_3$ were mixed and ground in an alumina mortar and sintered at 1,200° C. for 3 hours to obtain a phosphor. An experiment was done to obtain a remaining luminance ratio after 1000 hours of operation, which is shown in Table 2, to determine the lifespan of the obtained phosphor.

TABLE 2

Remaining luminance ratio after 1,000 hours of operation and the amount of S in host matrix measured by Inductively Coupled Plasma (ICP)

| Example | Amount of S in host matrix measured by ICP (wt %) | Initial relative luminance | Remaining luminance ratio after 1000 hours of operation |
|---|---|---|---|
| Example 1 | 0.16 | 100% | 65% |
| Example 2 | 0.4 | 110% | 70% |
| Example 3 | 0.75 | 95% | 70% |
| Example 4 | 1.4 | 90% | 70% |
| Example 5 | 0.2 | 110% | 80% |
| Example 6 | 0.3 | 100% | 90% |
| Example 7 | 0.2 | 110% | 70% |
| Example 8 | 0.3 | 110% | 70% |
| Comparative Example | 0 | 100% | 40% |

The 1000-hour remaining luminance ratio is defined by a percentage of remaining luminance measured after 1,000 hours of operation with respect to an initial luminance of a phosphor. The S-containing phosphor according to the present invention has a remaining luminance ratio higher than conventional phosphors containing no S.

As described above, the present invention provides a phosphor containing S, which has good luminance and lifespan characteristics compared to conventional $SrTiO_3$ based phosphors, without using cadmium that is harmful to the environment. Therefore, the phosphors according to the present invention are advantageously utilized for various display applications including vacuum fluorescent displays (VFDs) and field emission displays (FEDs).

Although a few preferred embodiments of the present invention have been shown and described, it will be appreciated by those skilled in the art that changes may be made in these embodiments without departing from the principles and the spirit of the invention, the scope of which is defined in the claims and their equivalents.

What is claimed is:

1. A phosphor comprising a perovskite structure which includes sulfur and satisfies the following relation:

$MTiO_3$:A where M is an alkaline earth metal and A is a rare earth element.

2. The phosphor of claim 1, wherein the alkaline earth metal is an element selected from the group consisting of magnesium (Mg), strontium (Sr), calcium (Ca), and barium (Ba).

3. The phosphor of claim 1, wherein the rare earth element is an element selected from the group consisting of cerium (Ce), praseodymium (Pr), europium (Eu), terbium (Tb), and thulium (Tm).

4. The phosphor of claim 1, wherein the rare earth element added to the phosphor is in a range of 0.05–5 mol % based on 1 mol of Ti.

5. The phosphor of claim 1, further comprising a Group 13 element of the periodic table.

6. The phosphor of claim 5, wherein the Group 13 element added to the phosphor is in a range of 0.05–80 mol % based on 1 mol of Ti.

7. The phosphor of claim 5, wherein the phosphor is one of $SrTiO_3$:Pr,Al which includes the sulfur and $SrTiO_3$:Pr,Ga which includes the sulfur.

8. The phosphor of claim 5, wherein the Group 13 element is one selected from the group consisting of aluminum (Al), gallium (Ga), indium (In), and thallium (Ti).

9. The phosphor of claim 8, wherein the Group 13 element added to the phosphor is in the range of 0.05–80 mol % based on 1 mol of Ti.

10. The phosphor of claim 1, wherein the sulfur contained in the phosphor is added in a form of a sulfur element or an alkaline metal sulfur-containing compound.

11. The phosphor of claim 10, wherein the alkaline metal sulfur-containing compound is one of: $Na_2S_2O_3 \cdot 5H_2O$ and $Na_2SO_4$.

12. The phosphor of claim 1, wherein the sulfur contained in the phosphor is in the range of 0.1–10 wt % based on a total weight of the phosphor.

13. The phosphor of claim 1, wherein
the alkaline earth metal is an element selected from the group consisting of Mg, Sr, Ca, and Ba, and
the rare earth element is an element selected from the group consisting of Ce, Pr, Eu, Tb, and Tm.

14. The phosphor of claim 13, wherein the sulfur contained in the phosphor is added in a form of a sulfur element or an alkaline metal sulfur-containing compound.

15. The phosphor of claim 14, wherein the rare earth element added to the phosphor is in a range of 0.05–5 mol % based on 1 mol of Ti.

16. The phosphor of claim 15, wherein the sulfur contained in the phosphor is in a range of 0.1–10 wt % based on a total weight of the phosphor.

17. The phosphor of claim 15, wherein the alkaline metal sulfur-containing compound is $Na_2S_2O_3 \cdot 5H_2O$ or $Na_2SO_4$.

18. The phosphor of claim 17, further comprising a Group 13 element selected from the group consisting of Al, Ga, In, and Ti.

19. The phosphor of claim 18, wherein the Group 13 element added to the phosphor is in a range of 0.05–80 mol % based on 1 mol of Ti.

20. The phosphor of claim 19, wherein the phosphor is one of $SrTiO_3$:Pr,Al which includes the sulfur and $SrTiO_3$:Pr,Ga which includes the sulfur.

21. A phosphor with a titanate host matrix having a perovskite structure which includes sulfur, an alkaline earth metal and a rare earth element, wherein sulfur atoms partially substitute oxygen atoms so as to vary lattice parameters of the phosphor.

22. A fluorescent display device comprising a phosphor comprising a perovskite structure which includes sulfur and satisfies the following relation:

$$MTiO_3:A$$

where M is an alkaline earth metal and A is a rare earth element.

23. The fluorescent display device of claim 22, wherein the fluorescent display device is one of a field emission display and a vacuum fluorescent display.

* * * * *

UNITED STATES PATENT AND TRADEMARK OFFICE
CERTIFICATE OF CORRECTION

PATENT NO. : 6,752,933 B2
DATED : June 22, 2004
INVENTOR(S) : II Yu et al.

It is certified that error appears in the above-identified patent and that said Letters Patent is hereby corrected as shown below:

Title page,
Item [56], References Cited, OTHER PUBLICATIONS, change
"Patent Abstracts of Japan, Publication No.: 08-0855788, dated Feb. 4, 1996" to
-- Patent Abstracts of Japan, Publication No.: 08-085788, dated Feb. 4, 1996 --.

Signed and Sealed this

Thirtieth Day of November, 2004

JON W. DUDAS
*Director of the United States Patent and Trademark Office*